Aug. 3, 1965      R. HERMANN      3,198,430
HUBODOMETER
Filed May 5, 1964      2 Sheets-Sheet 1
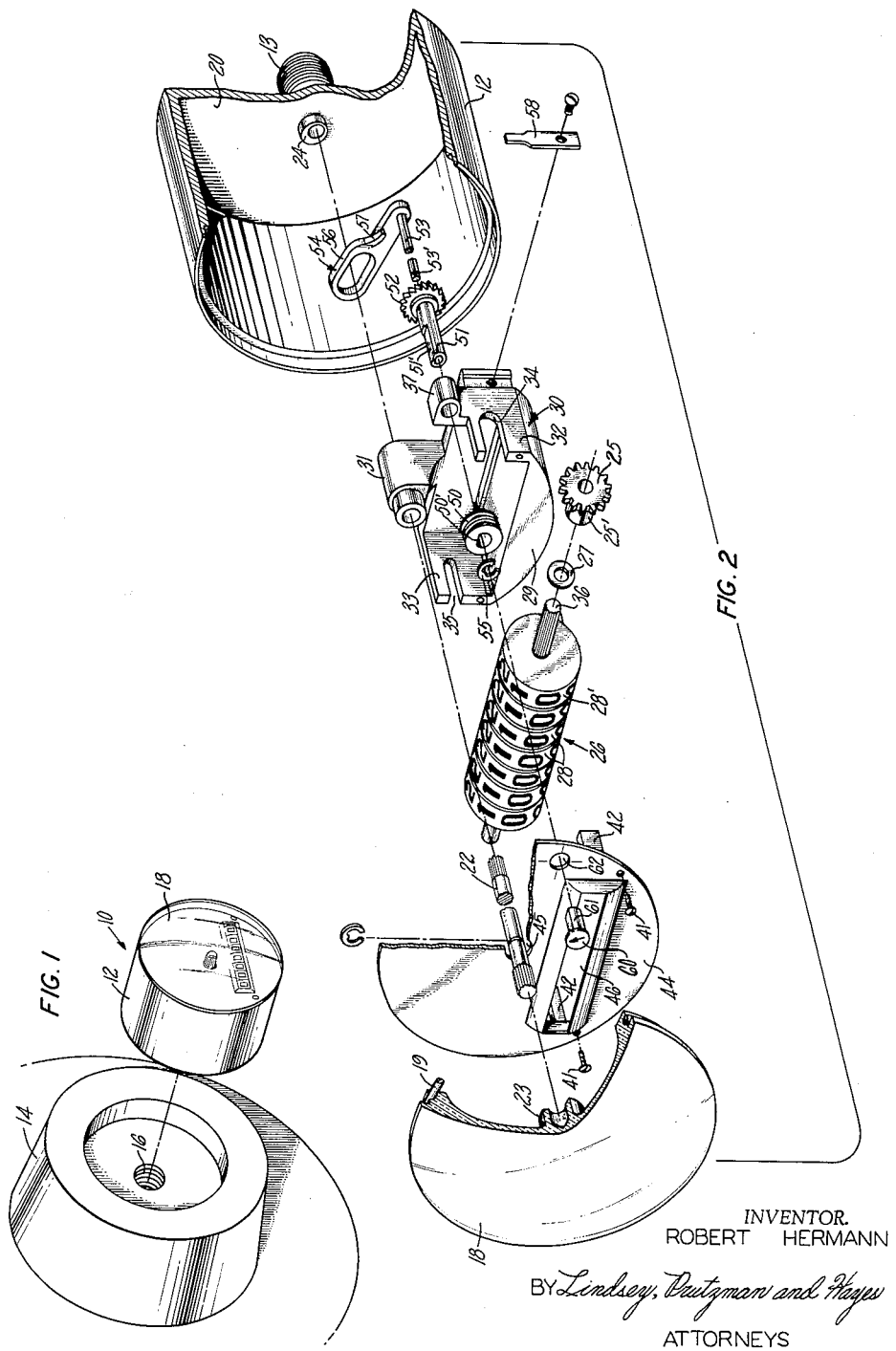
INVENTOR.
ROBERT HERMANN
BY Lindsey, Deutzman and Hayes
ATTORNEYS Aug. 3, 1965  R. HERMANN  3,198,430
HUBODOMETER Filed May 5, 1964  2 Sheets-Sheet 2

INVENTOR.
ROBERT HERMANN
BY *Lindsey Pautzman and Hayes*
ATTORNEYS

United States Patent Office 3,198,430
    Patented Aug. 3, 1965

3,198,430
    HUBODOMETER
    Robert Hermann, Hartford, Conn., assignor to Veeder-Root Incorporated, Hartford, Conn., a corporation of Connecticut
    Filed May 5, 1964, Ser. No. 364,985
    3 Claims. (Cl. 235—95)

This invention relates to hubodometers of the type comprising an odometer which can be mounted upon the hub of a rotating unit for rotation therein for counting the revolutions of the rotating unit, and which is actuated by the weight of the internal mechanism which is suspended within and does not rotate with the outer casing of the unit.

It is an object of this invention to provide an improved hubodometer of exceedingly simple, integral construction which immediately responds to movements of the rotating unit, regardless of direction, resulting in exceptional counting accuracy despite the impact and shock of rugged operation conditions.

A further object is to provide an improved hubodometer of exceptionally compact assembly capable of a variety of commercial uses and affording easy accessibility for changing gear ratios and notable economies in its manufacture and which incorporates improved means for promptly verifying the operational condition of the hubodometer.

Other objects will be in part obvious and in part pointed out more in detail hereinafter.

The invention accordingly consists in the features of construction, combination of elements and arrangement of parts which will be exemplified in the construction hereafter set forth, and the scope of the application of which will be indicated in the appended claims.

In the drawings:

FIG. 1 is an isometric view showing a hubodometer and a rotatable hub of a wheel upon which the hubodometer is to be mounted;

FIG. 2 is an enlarged exploded isometric view, partly broken away, of the hubodometer of FIG. 1, illustrating the operational components of the assembly incorporating this invention;

Figure 3:
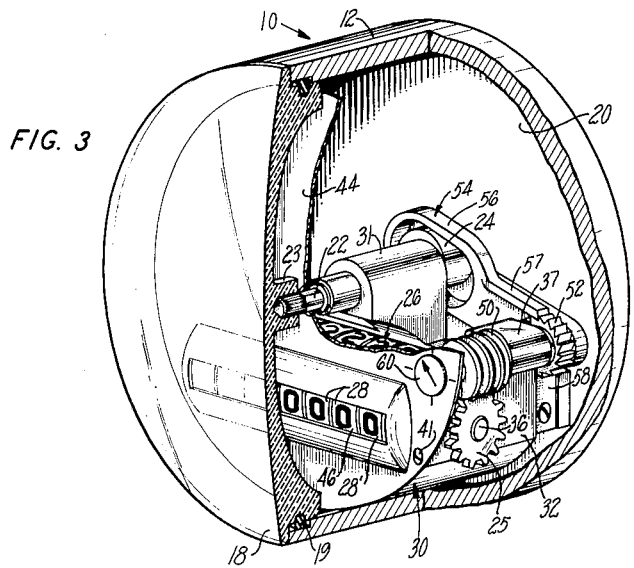
FIG. 3 is an enlarged, partly broken away, isometric view of the hubodometer showing the working relationship of the assembled components of FIG. 2.
Figure 4:
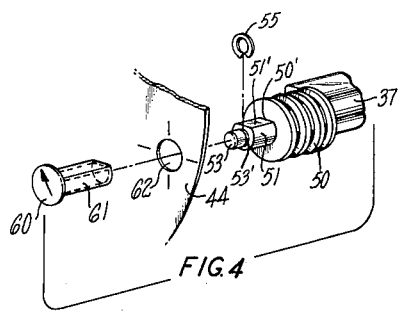
FIG. 4 is a fragmentary, partly exploded isometric view of a portion of the device shown in FIG. 3 including the worm and operation indicator.
Figure 5:
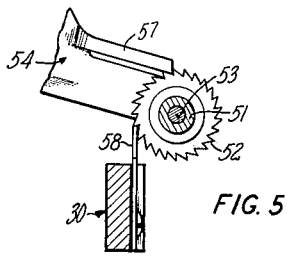
FIG. 5 is an enlarged fragmentary view partially in cross section of a portion of the drive heading of the device shown.

Referring now to the drawings, a hubodometer 10 is shown in FIG. 1 having a cylindrical casing 12 to be mounted on a rotatable unit or hub 14 such as that of a vehicle wheel by any suitable means. In the specific embodiment the mounting is provided by a threaded boss 13 adapted to be screwed into a threaded aperture 16 whereby no external fasteners are required. The casing 12 which is generally cup shaped is formed with an integral rear wall 20 and is closed at the front end by a window 18 of transparent material which is sealed with a gasket 19 of the O ring type so as to provide a substantially leakproof container. A supporting shaft 22 is non-rotatably fixed within the housing at the rotational axis thereof, the ends of the shaft being splined and fixed at the front window 18 and back wall 20 respectively having therein an apertured boss 23 and apertured cam 24. The latter is eccentric in configuration so as to provide a drive cam for the counting mechanism as described more particularly hereinafter.

A frame 30 within the casing 12 is provided with an upwardly extending portion 31 forming a journal through which the shaft 22 extends and by means of which the frame is suspended so as to be positioned with its center of gravity well below shaft 22. The base of the frame indicated at 29 is formed as a thick weighted section to provide a lower center of gravity and a desirable moment of inertia. The side plates 32, 33 of the frame 30 are provided with forwardly opening horizontal slots 34, 35 for receiving the shaft 36 of a counter 26, the shaft 36 being mounted in transverse relationship to the shaft 22. Shaft 36 supports a plurality of number wheels 28 in side-by-side relationship, the number wheels being provided with the usual transfer mechanism (not shown) for advancing the number wheels of higher order responsive to rotation of the number wheel 28' of lowest order. The number wheels have indicia thereon and in the specific embodiment are intended to register the mileage or distance traveled by the vehicle to whose wheel the hubodometer is attached. In the specific embodiment, the number wheel 28' is fixed to the shaft 36 so as to rotate therewith, whereby the shaft 36 functions as the counter drive shaft as well as the wheel supporting shaft. A worm wheel 25 having its hub 25' splined to the outer end of shaft 36 and separated from number wheel 28' by a loose washer 27 is used to drive the counter.

The counter shaft 36 is held in the frame 30 by a pair of horizontal prongs 42 projecting rearwardly from the back of a face plate 44 secured to the forward end of the frame by screws 41. The prongs 42 are positioned so as to extend into the slots 34, 35 whereby the shaft 36 is restrained from moving out of the slots 34, 35. The face plate 44 is of a circular configuration dimensioned to have a clearance fit within the casing 12 and is apertured at 46 to expose the counter 26 to view. An opening 45 at the center of the cover plate 44 is provided to accommodate the forward extension of the shaft 22 which extends into the boss 23 on the window 18.

The worm wheel 25 is in mesh with a worm 50 mounted on one end of a sleeve or hollow shaft 51 which is journaled in a bearing 37 formed at the upper portion of the frame side plate 32 so as to extend generally parallel to but offset from the supporting shaft 22. The opposite end of sleeve 51 has fixed thereto a ratchet wheel 52, and extending through the sleeve and journaled therein is a spindle 53 forming a pivot for and connected to a cam follower 54. The worm 50 is axially slideable on the sleeve 51 but relative turning movement is prevented by the interengaging flats 50' and 51' on the worm and sleeve respectively. The assembly of the worm 50, the sleeve 51 with ratchet wheel 52 attached thereto, and inner spindle 53 to which the cam followers 54 is attached, are held in assembled relationship by a removable particircular washer 55 received in the slot 53' in the end of the spindle 53. The manner in which these parts are mounted not only permits rapid and easy assembly but also dissassembly and replacement in the event that it is desired to change the gear ratio for a particular installation. Similar ease of assembly and disassembly and replacement is also true of the worm wheel 25 which is merely splined to the counter shaft 36.

The cam follower 54 is in the form of a lever having a yoke 56 at one end encompassing the eccentric drive cam 24 fixed to the rear wall 20 of the casing. As a result of this construction, the cam follower 54 is oscillated about its pivot at the spindle 53 responsive to relative motion of the casing 12 and frame 30 in either direction. Also, since the cam follower 54 is held in captured relationship with respect to cam 24 by reason of the yoke construction, it cannot oscillate except in response to turning movement of the cam and thus is not affected by jolts or bumps to which the mechanism might be subjected during use.

The cam follower 54 has a tongue-like pawl 57 integrally formed thereon which is slightly offset from the plane thereof so that its free end engages the teeth of the ratchet wheel 52. Accordingly, oscillating movement of the cam follower 54 is translated into turning movement of the ratchet wheel 52. A no-back pawl 58 fixed to the side wall 32 of the frame and also engaging the teeth of the ratchet wheel 52 effectively prevents reverse turning of the ratchet wheel 52 due to the drag of the tongue 57. For economy and convenience of manufacture, the cam follower 54 with its integral tongue 57 may be molded as a single unit of plastic such as natural "Delrin" and, similarly, plastic molding techniques may be used to form the remainder of the gear train units and the counter wheels.

A telltale indicator 60 may be provided at the front of the face plate 44 for viewing by the operator to permit easy checking of the functioning of the odometer. In the specific embodiment, the indicator 60 is shown as a disc having a mark or indicia thereon such as the arrow shown and having a hub 61 with a flat portion thereon extending through an aperture 62 in the face plate 44 and being engaged on the end of the sleeve 51. By reason of the drive arrangement employed in the hubodometer, as described, each turn of the hub on which the odometer is mounted is irreversibly transmitted into turning movement of the ratchet wheel 52. It is thus assured that the count registered on the counter 26 will be reasonably accurate despite frequent changes in direction of rotation of the hub or a reversal of direction after a very brief movement in one direction. Also, operation of the odometer will be revealed by immediate turning movement of the telltale indicator without requiring that the hub be turned a much greater number of times sufficient to advance the count on the counter 26.

For simplicity of presentation, the hubodometer shown in the drawing does not contain any damping liquid. However, it will be readily appreciated that inasmuch as the casing 12 is made liquid tight, a quantity of damping liquid such as kerosene or light oil may be introduced into the casing to lessen the effects of jolts and bumps in such installations where such damping is found to be beneficial.

As will be apparent from the foregoing description, the hubodometer of the present invention is of compact and simplified construction and yet durable and rugged and trouble free in operation. It may be fabricated and assembled at low cost using a minimum of easily manufactured parts which are readily interchangeable while at the same time preserving accuracy of the counting operation and convenience of use. While the invention has been described primarily in connection with a unit primarily adapted to be mounted on the hub of the wheel of a vehicle to register the mileage or distance traveled, it will be apparent that the unit may have a variety of similar uses where it is desired to count the rotations of any member to which the unit is attached.

As will be apparent to persons skilled in the art, various modifications and adaptations of the structure above described will become readily apparent without departure from the spirit and scope of the invention, the scope of which is defined in the appended claims.

I claim:
1. A hubodometer for use with a rotatable unit and comprising a casing, mounting means for mounting the casing upon the rotatable unit for rotation therewith, said casing having a wall at one end for engagement with the rotatable unit and having a window at its other end, an elongated shaft disposed coaxially with the axis of rotation of the casing and extending between said wall and window, a frame having a weighted base suspended from the shaft with its center of gravity below the shaft for rotation relative to the casing, a counter having a wheel supporting shaft mounted transversely on the frame adjacent the window, and means for driving the counter in a forward direction during relative movement of the frame and casing in either direction comprising an eccentric cam mounted on the casing for rotation therewith, a follower mounted on the frame for pivotal movement about an axis parallel to but offset from the axis of rotation of the casing, said follower having a yoke portion embracing the cam, a pawl on the follower, a ratchet wheel rotatably mounted on the frame for engagement by the pawl, a worm coaxially mounted with the ratchet wheel and connected thereto, and a worm wheel connected to the counter shaft and engaging the worm.

2. A hubodometer for use with a rotatable unit and comprising a casing, mounting means for affixing the casing upon the rotatable unit for rotation therewith, a frame, supporting means rotatably supporting the frame within the casing for rotation about the axis of rotation of the casing and with the center of gravity of the frame below the axis of rotation of the casing, a counter mounted on the frame and a window in the casing to permit viewing of the counter, a drive shaft rotatably mounted on the frame parallel to but offset from the axis of rotation of the casing, a cam at the axis of rotation of the casing fixed to the casing for rotation therewith, said cam having a circumferential camming edge, a follower mounted on the frame for pivotal movement coaxially with the drive shaft, the follower having a yoke portion embracing the cam for actuation thereby during rotation of the casing relative to the frame, a ratchet pawl on the follower, a ratchet wheel fixed to the drive shaft for engagement by the ratchet pawl, and drive means for operably connecting the drive shaft with the counter for driving the counter during rotation of the drive shaft.

3. A hubodometer as set forth in claim 2 wherein a telltale indicator is mounted on the end of the drive shaft adjacent the window to indicate rotation of the drive shaft.

References Cited by the Examiner
UNITED STATES PATENTS

| | | | |
|---|---|---|---|
| 1,010,654 | 12/11 | Madden | 235—95.3 |
| 1,357,422 | 11/20 | Richard | 235—95.2 |
| 1,424,000 | 7/22 | Carson | 235—95 |
| 1,488,631 | 4/24 | Berge | 235—96 |
| 2,071,654 | 2/37 | Paschen et al. | 235—95.2 |
| 2,310,296 | 2/43 | Knopf | 235—95.3 |
| 2,638,274 | 5/53 | Engler | 235—95.3 |
| 2,700,862 | 2/55 | Abel | 116—115 |
| 3,130,907 | 4/64 | Coffey | 235—95 |

FOREIGN PATENTS 232,692    4/25    Great Britain.

LOUIS J. CAPOZI, *Primary Examiner.*